Oct. 7, 1941.  O. J. HORGER  2,258,570
RAILWAY CAR AXLE BEARING
Filed March 3, 1941  2 Sheets-Sheet 2
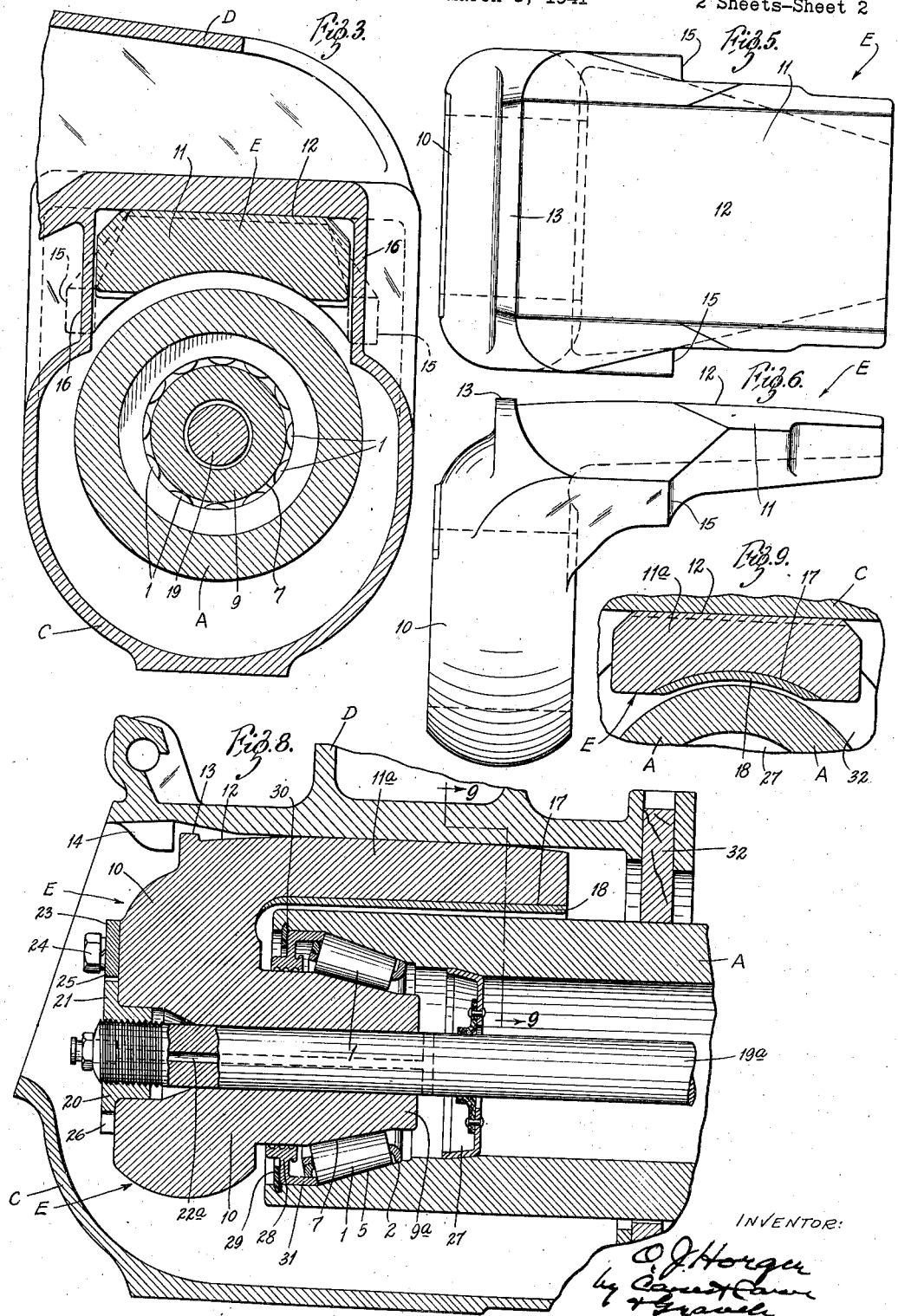
INVENTOR:
O. J. Horger
HIS ATTORNEYS.

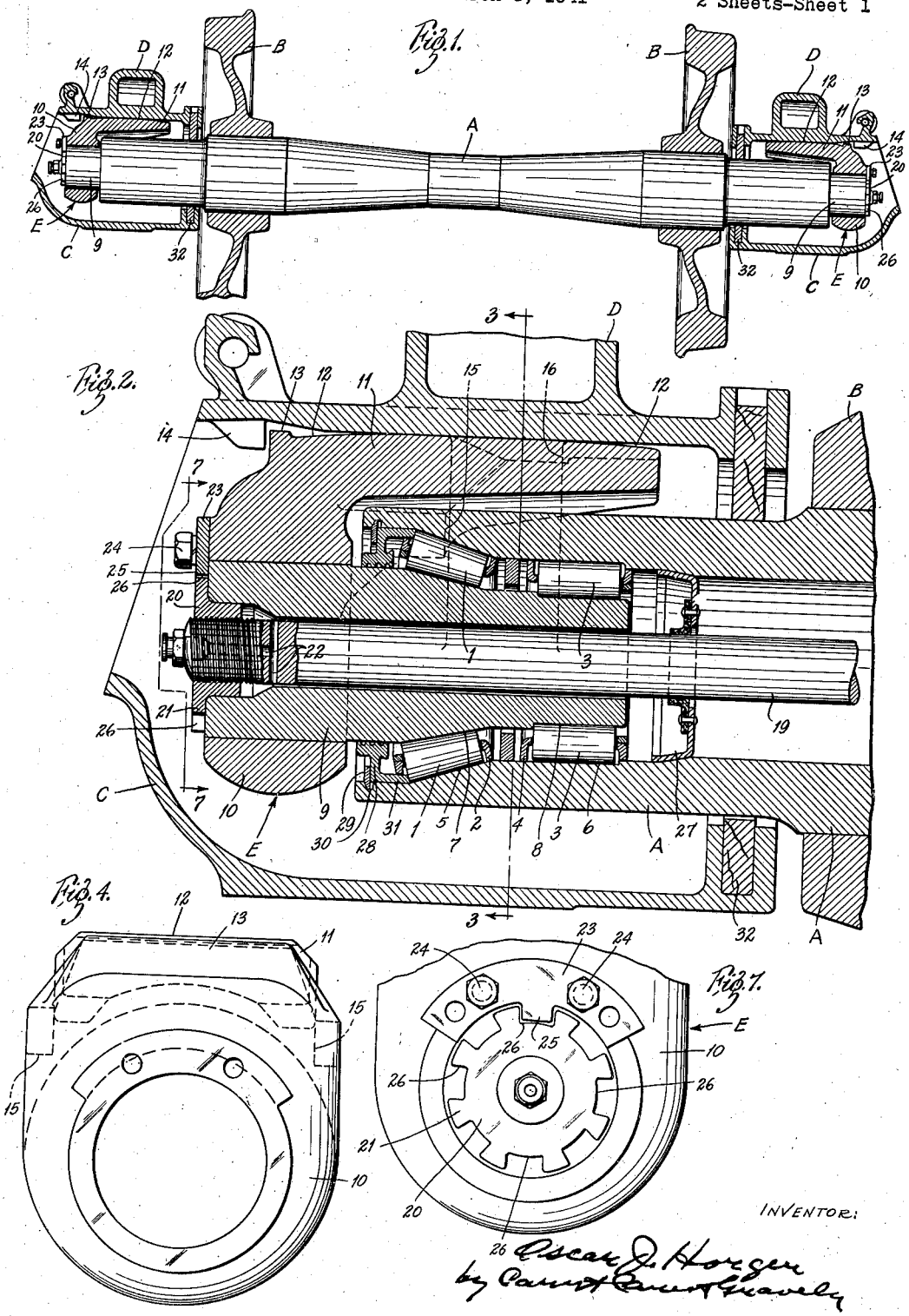

Patented Oct. 7, 1941

2,258,570

UNITED STATES PATENT OFFICE 2,258,570

RAILWAY CAR AXLE BEARING

Oscar J. Horger, Canton, Ohio, assignor to The Timken Roller Bearing Company, Canton, Ohio, a corporation of Ohio Application March 3, 1941, Serial No. 381,472

20 Claims. (Cl. 308—180)

My invention relates to bearings for railway car axles and has for its principal object a roller bearing mounting which can be used in present standard A. A. R. journal boxes intended for plain bearings. Another object is the mounting of a roller bearing inside a tubular axle. Other objects and advantages will appear hereinafter.

The invention consists principally in supporting a roller bearing in the end of a tubular axle by means of a bracket member having a spindle extending into the axle, an upwardly extending supporting wall and a rearwardly extending top plate member whose upper surface engages the journal box and whose lower or inner surface is normally clear of the hollow axle. The invention further consists in the railway car axle bearing and in the parts and combinations and arrangements of parts hereinafter described and claimed.

In the accompanying drawings, wherein like reference numerals indicate like parts wherever they occur, Fig. 1 is a sectional view of railway car axle bearings embodying my invention, one at each end of a railway car axle, which is shown in elevation, Fig. 2 is an enlarged longitudinal sectional view showing one journal box and its bearing and axle, Fig. 3 is a cross-sectional view on the line 3—3 in Fig. 2, Fig. 4 is an end elevation of the supporting bracket member for the bearing, Fig. 5 is a top plan view thereof, Fig. 6 is a side elevation thereof, Fig. 7 is a fragmentary vertical section on the line 7—7 in Fig. 2, Fig. 8 is a central longitudinal sectional view similar to Fig. 2, showing a modification; and Fig. 9 is a fragmentary vertical section on the line 9—9 in Fig. 8.

In Fig. 1 is illustrated a railway car axle A having wheels B thereon near its ends and having its end portions extending into journal boxes C, which, in accordance with common practice, may be made integral with or separate from the side frames D of the car truck. The journal boxes C are of the standard A. A. R. type now used with standard A. A. R. journal bearings and wedges (not shown). The axle A is hollow and is adapted to receive rotary antifriction bearings in the end portions thereof. The bearing in each end of the tubular axle A preferably comprises a circular series of tapered bearing rollers 1 located near the end of the axle and provided with a suitable retaining cage 2 and a circular series of cylindrical rollers 3 spaced inwardly of said tapered bearing rollers and provided with a suitable retaining cage 4. The bore of the hollow cylindrical axle A is flared near each end to provide a conical outer raceway 5 for the tapered bearing rollers 1; and said bore is counter-bored inwardly of said conical outer raceway to provide a cylindrical outer raceway 6 for the cylindrical bearing rollers 3.

The tapered inner raceway or cone 7 for the tapered bearing rollers 1 of each double roller bearing and the cylindrical inner raceway 8 for the cylindrical bearing rollers 3 of said bearing are both formed on the hollow spindle or stub axle member or portion 9 of a supporting bracket, indicated generally by E. The spindle 9 of each bracket E extends axially into one end of the hollow axle A; and rigid with the outermost end of said spindle is an upwardly projecting wall portion or member 10 from the top of which an adapter plate 11 extends horizontally rearwardly in overhanging relation to said end of said axle. The spindle 9 of each bracket is preferably made in the form of a separate member which is pressfitted in an opening provided therefor in the outer end wall 10 of said bracket.

The adapter plate 11 of each bracket is disposed between the axle A and the top wall of the standard A. A. R. journal box C and is shaped to cooperate with said journal box in the same manner as the standard A. A. R. journal bearing and wedge now used with said journal box. Thus, the adapter plate 11 has its upper surface 12 convexly curved endwise for cooperation with the under surface of the top wall of the standard journal box C; it also has an upstanding lug 13 at its outer end adapted to cooperate with a stop lug 14 in the outer end of said journal box to limit relative sliding movement of the axle A and said journal box; and it also has outstanding lugs 15 at the sides thereof adapted to cooperate with stop ribs 16 formed in the side wall of said journal box to limit said relative sliding movement of said axle and said journal box in the opposite direction. The adapter plates 11 are spaced away from the outer surface of the axle A and the vertical load is transmitted from the tops of the journal boxes to said adapter plates and thence through the spindles 9 thereof and the roller bearings to said axle.

The supporting brackets E at the opposite ends of the axle A are held together and proper adjustment of the roller bearings obtained by means of an elongated tie rod or bolt 19 that extends through the axial bores in the spindles 9 of said brackets and has its ends threaded to receive clamping nuts 20 that fit in counterbores provided therefor in the outer ends of the axial bores of the spindles 9 of the respective brackets and have annular outstanding flanges 21 at their outer ends that bear or seat against the outer ends of said spindles. By this arrangement, the brackets E may be adjusted endwise of the axle A to obtain the desired amount of play between the tapered bearing rollers 1 and their conical inner and outer raceways 5 and 7, respectively. The flanged nuts 20 may be locked in the desired position of adjustment by means of arcuate locking plates 23 that are secured by cap screws 24 to the outer ends of the brackets E and have detents or lugs 25 adapted to seat in peripheral notches 26 provided therefore in the flanges 21 of said nuts.

The bolts 19 may be provided with lubricant passageways 22 that lead inwardly from the ends thereof and open laterally into the bores of the spindles 9 of the supporting brackets E. As shown in the drawings, an annular clearance space is provided between the connecting rod 19 and the axial bore provided therefor in the spindles 9 of each bracket E, thereby permitting flow of the lubricant into the hollow axle A. Such lubricant is held in the bearing receiving end portion of the axle by an annular lubricant seal 27 that seats in said axle opposite the inner end of the spindle 9 therein and closely encircles the connecting rod 19 and by an annular end closure plate 28 that is sleeved on said spindle and fits in said axle housing opposite the large or outer ends of the tapered bearing rollers therein. The annular end closure plate 28 is retained in the axle A preferably by means of a split locking ring 29 that seats in an annular groove 30 provided therefor in the bore of said axle; and said closure plate has an inwardly extending peripheral flange 31 that serves as an annular thrust shoulder for the large or outer ends of the tapered bearing rollers 1. In accordance with common practice, each journal box C is provided at its inner end with a pocket for a standard dust guard 32 which fits closely around the axle.

In the modified construction shown in Fig. 8, the supporting bracket has a short spindle 9a formed integral with the end wall 10 thereof; and the bearing is a single row bearing comprising the tapered series of bearing rollers 1 only. The connecting rod 19a snugly fits in the axial bore of the spindle 9a and is held by a nut 20 threaded thereon in abutting relation to the outer face of the end wall 10 of the supporting bracket. The oil passageway 22a extends from the outer end of the rod 19a and opens into the bore of the hollow axle A between the inner end of the spindle 9a and the annular lubricant seal 27 in said axle. In the modified construction, the adapter plate 11a, like the journal bearing of the standard journal box, has its lower or inner surface 17 transversely curved in conformity with the cylindrical outer surface of the axle A provided with a lining 18 of Babbitt or other bearing metal. The adapter plate 11a is normally clear of the outer surface of the axle A, but is adapted to operate after the manner of a standard A. A. R. journal bearing in the event that failure of the roller bearing should cause said adapter plate to drop into contact with said axle.

The above construction permits the use of hollow axles, which have many well known advantages, but by mounting roller bearings in the ends of the axle, conserves space and permits the use of present standard A. A. R. journal boxes. The bracket mounting of the bearing permits alining movement of the axle in the journal boxes without disturbing the roller bearings. A plain bearing is provided in the event of roller bearing failure without necessitating the use of additional parts. The bearings are easily adjusted and easily removed. Obviously, numerous changes may be made without departing from the invention and I do not wish to be limited to the precise construction shown.

What I claim is:

1. A railway car axle bearing comprising a journal box, an axle extending thereinto, a bearing in the end of said axle and a bracket disposed in said journal box and having a spindle portion supported in said bearing and a plate portion supporting said journal box.

2. A railway car axle bearing comprising a journal box, an axle extending thereinto, a roller bearing in the end of said axle and a bracket disposed in said journal box and having a spindle portion supported in said roller bearing and a plate portion overhanging said end of said axle and supporting said journal box.

3. A railway car axle bearing comprising a journal box, a hollow axle extending thereinto, a bearing in the end of said axle and a supporting bracket having a spindle portion extending into said axle and a plate portion engaging said journal box.

4. A railway car axle bearing comprising a journal box, a hollow axle extending thereinto, a roller bearing in the end of said axle and a supporting bracket having a spindle portion extending into said axle and a plate portion engaging said journal box.

5. A railway car axle bearing comprising a journal box, a hollow axle extending thereinto, said axle having a raceway portion at the end of its bore, a supporting bracket having a spindle portion extending into said axle and bearing rollers interposed between said spindle and said axle, said bracket also having a rearwardly extending plate in engagement with the top of said journal box.

6. A railway car axle bearing comprising a journal box, a hollow axle extending thereinto, a supporting bracket having a spindle portion extending into said axle and two circular series of bearing rollers interposed between and spaced apart longitudinally of said spindle and said axle, said bracket also having a plate in engagement with the top of said journal box for supporting the latter.

7. A railway car axle bearing comprising a journal box, a hollow axle extending thereinto, said axle having an outwardly flaring raceway portion at the end of its bore, a supporting bracket having a conical spindle portion extending into said axle and bearing rollers interposed between said spindle and said axle, said bracket also having a rearwardly extending plate in engagement with the top of said journal box.

8. A railway car axle bearing comprising a journal box, a hollow axle extending thereinto, a supporting bracket having a spindle portion extending into said axle, and separate series of tapered and cylindrical bearing rollers interposed between and spaced apart longitudinally of said spindle and said axle, said bracket also having a plate portion in engagement with the top of said journal box for supporting the latter.

9. A railway car axle bearing comprising a journal box, a hollow axle extending thereinto, said axle having an outwardly flaring raceway portion at the end of its bore, a supporting bracket having a conical spindle portion extending into said axle and conical bearing rollers interposed between said spindle and said axle, said bracket also having a rearwardly extending plate in engagement with the top of said journal box.

10. A railway car axle bearing comprising a journal box, a hollow axle extending thereinto, a supporting bracket having a spindle portion extending into said axle and bearing rollers interposed between said spindle and said axle, said bracket also having a rearwardly extending plate in engagement with the top of said journal box for supporting the latter, and the lower surface of said plate being of arcuate shape, normally spaced slightly from said axle whereby said plate portion is adapted to function as a plain journal bearing in event of failure of said roller bearing.

11. A railway car axle bearing comprising a journal box, a hollow axle extending thereinto, said axle having an outwardly flaring raceway portion at the end of its bore, a supporting bracket having a conical spindle portion extending into said axle and conical bearing rollers interposed between said spindle and said axle, said bracket also having a rearwardly extending plate in engagement with the top of said journal box, and the lower surface of said plate being of arcuate shape, normally spaced slightly from said axle and lined with bearing material whereby a plain bearing is provided in event of failure of said roller bearing.

12. A railway car axle bearing comprising a journal box, a hollow axle extending thereinto, said axle having an outwardly flaring raceway portion at the end of its bore and a cylindrical raceway portion adjacent thereto, a supporting bracket having a spindle portion extending into said axle and provided with a conical raceway portion and a cylindrical raceway portion for cooperation with said conical and cylindrical raceways respectively of said axle, conical bearing rollers interposed between said conical raceways and cylindrical rollers between said cylindrical raceways, said bracket also having a rearwardly extending plate in engagement with the top of said journal box.

13. A railway car axle bearing mounting comprising spaced journal boxes, a hollow axle having end portions extending into said journal boxes, the ends of the bore of said axle flaring outwardly and forming bearing raceways, a supporting bracket in each journal box having an upper plate in engagement with the top of one of said journal boxes and having a conical spindle extending into an end of the axle, bearing rollers interposed between said spindles and the end portions of the bore of said axle and a tie rod extending through said axles and spindle portions to secure said bracket members together.

14. A railway car axle bearing mounting comprising spaced journal boxes, a hollow axle having end portions extending into said journal boxes, the ends of the bore of said axle flaring outwardly and forming bearing raceways, a supporting bracket in each journal box having an upper plate whose top is convexly curved endwise and in engagement with the top of one of said journal boxes and having a conical spindle extending into an end of the axle, bearing rollers interposed between said spindles and the end portions of the bore of said axle and a tie rod extending through said axle and spindle portions to secure said bracket members together.

15. A railway car axle bearing comprising a journal box having stops in the outer end thereof and in the sides thereof, a hollow axle extending thereinto, a supporting bracket having a spindle portion extending into said axle and bearing rollers interposed between said spindle portion and said axle, said bracket also having a rearwardly extending plate in engagement with the top of said journal box, said bracket being disposed with its outer end in abutting relation to the stop in the outer end of said journal box and having side lugs for cooperation with the stops in the sides of said journal box.

16. A railway car axle bearing mounting comprising spaced journal boxes, a hollow axle having end portions extending into said journal boxes, a supporting bracket in each journal box having an upper plate in engagement with the top of one of said journal boxes and having a spindle extending into an end of the axle, bearing rollers interposed between said spindles and the bore of said axle, a tie rod extending through said axles and spindles, and nuts threaded on the ends of said tie rod and bearing against the outer ends of the respective supporting brackets.

17. A railway car axle bearing mounting comprising spaced journal boxes, a hollow axle having end portions extending into said journal boxes, supporting brackets in said journal boxes having upper plate portions in engagement with the tops thereof and having spindles extending into the ends of the axle, bearing rollers interposed between said spindles and the bore of said axle, a tie rod extending through said axles and spindle portions, nuts threaded on the ends of said tie rod and having peripherally notched flanges seated against the outer ends of said brackets, and locking plates fixed to said ends of said brackets and having portions seated in the peripheral notches in the flanges of said nuts.

18. A railway car axle bearing mounting comprising spaced journal boxes, a hollow axle having end portions extending into said journal boxes, a supporting bracket in each journal box having an upper plate in engagement with the top of one of said journal boxes and having a spindle extending into an end of the axle, bearing rollers interposed between said spindles and the end portions of the bore of said axle, a tie rod extending through said axles and spindle portions, a nut on each end of said tie rod in abutting relation to the outer end of a bracket, an annular lubricant seal interposed between said tie rod and the bore of said axle adjacent to the inner end of each spindle, an annular end closure member interposed between said bore of said axle and each spindle adjacent to the outer ends of the bearing rollers cooperating therewith, and means for admitting lubricant to said bore of said axle between the inner end of each spindle and the annular lubricant seal adjacent thereto.

19. A railway car axle bearing mounting comprising spaced journal boxes, a hollow axle having end portions extending into said journal boxes, a supporting bracket in each journal box having an upper plate in engagement with the top of one of said journal boxes and having a spindle extending into an end of the axle, bearing rollers interposed between said spindles and the end portions of the bore of said axle, a tie rod extending through said axles and spindle portions, a nut on each end of said tie rod in abutting relation to the outer end of a bracket, an annular lubricant seal interposed between said tie rod and the bore of said axle adjacent to the inner end of each spindle, an annular end closure member interposed between said bore of said axle and each spindle adjacent to the outer ends of the bearing rollers cooperating therewith, and means for admitting lubricant to said bore of said axle between the inner end of each spindle and the annular lubricant seal adjacent thereto, said means comprising a passageway leading from an end of said tie rod and opening into said bore of said axle between said inner end of said spindle and said adjacent lubricant seal.

20. A railway car axle bearing mounting comprising spaced journal boxes, a hollow axle having end portions extending into said journal boxes, a supporting bracket in each journal box having an upper plate in engagement with the top of one of said journal boxes and having a hollow spindle extending into an end of the axle, bearing rollers interposed between said spindles and the end portions of the bore of said axle, a tie rod extending through said hollow axle and spindles to secure said bracket members together, an annular lubricant seal interposed between said bore of said axle and said tie rod adjacent to the inner end of each spindle, and an annular end closure for the annular space between said spindle and the adjacent end of the bore of said axle, said tie rod having a lubricant passageway leading from one end thereof and opening into the bore of said spindle, a clearance space being provided between said tie rod and the bore of said spindle for establishing communication between said passageway and the space between the inner end of said spindle and the annular seal adjacent thereto.

OSCAR J. HORGER.